United States Patent Office 3,030,279
Patented Apr. 17, 1962

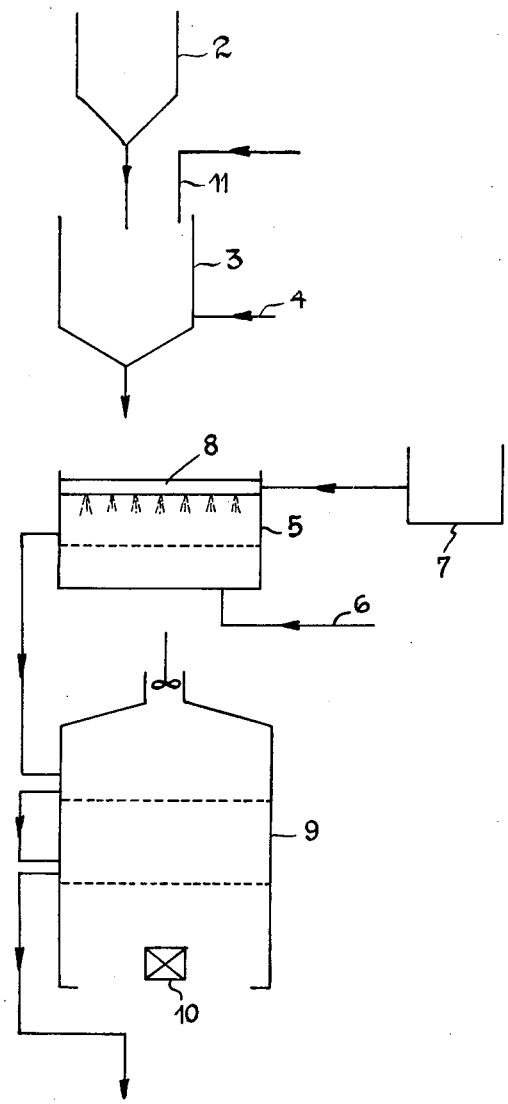

3,030,279
TREATMENT OF CEREAL GRAINS
Jacques de la Kéthulle de Ryhove, Alost, Jean Pierre de la Kéthulle de Ryhove, Overhamme St. Marie, Albert Schoolmeester, Alost, and Réginald de Hemptinne, Melle, Belgium, assignors to Usines "Le Lion D'Or" Distillerie-Malterie-Fabrique de Levure, Societe Anonyme, Alost, Belgium, a corporation of Belgium
Filed Feb. 27, 1959, Ser. No. 796,053
Claims priority, application Luxembourg Mar. 8, 1958
6 Claims. (Cl. 195—71)

This invention is concerned with improvements in or relating to the treatment of cereal grains, such as barley, wheat and rye. In particular it is concerned with a process of treating cereal grains, particularly barley, in which process the barley grains are essentially submitted to a soaking, a germination and a drying, so as to form malt.

It is known that the above mentioned process of producing malt has the purpose of converting barley or other cereals into malt, that is to say to develop, a complete diastasic system in the grains through their germination. The diastases break down the complex reserve substances of the grains, such as the starch, the proteins and the fats into more simple substances which are more easily assimilated by the plant embryo which is then able to develop.

By the diastasic action the starch is broken down into maltose which is then attacked by the yeasts so that it is converted first into glucose, then into ethyl alcohol and carbon dioxide, such as in the manufacture of beer.

It has now been found that the chemical and biochemical properties of the malt obtained by the above stated known process can be improved to a surprisingly high degree by a simple and inexpensive treatment of the barley grains submitted to the malting.

Thus, the treatment according to the invention, which is described below has the unexpected effect of increasing noticeably the percentage of dry extract content and the amount of soluble nitrogenous materials in the malt which is particularly interesting for the brewing industry as well as being of general interest for all malt-utilizing industries.

The unexpected results obtained by the process according to the invention have been clearly shown by numerous experiments on the laboratory scale and on the industrial scale which are dealt with below.

According to the invention the grains, after their soaking are caused to absorb at least one carbohydrate to the extent of at least 1% by weight of carbohydrate considered as dry material in relation to the starting weight of dry material. One can use as carbohydrates both monosaccharides, as well as polysaccharides suitable for human consumption, and also products containing them. Among the carbohydrates, which can be used in the process according to the invention, one can mention inter alia glucose, notably glucose chips or solid glucose, invert sugar, saccharose, dextrin, maltose, fructose, lactose, arabinose, galactose, molasses and denatured sugar as well as mixtures thereof. Preferably, glucose is used as carbohydrate, although the other carbohydrates, such as those mentioned above, can be used.

The quantity of carbohydrate which the grains are caused to absorb in the course of their malting can vary within wide limits. It is, however, convenient according to one feature of the invention, to cause the grains to absorb a quantity of carbohydrate lower than that which would have the effect of rendering the malt sticky. In fact, if one causes the grains to absorb an excessive quantity of carbohydrate, the resulting malt becomes sticky.

In the case where use is made of glucose chips or solid glucose as the carbohydrate (that is to say a substance containing an average 80% of extract in relation to dry material and a "dextrose equivalent" (D.E.) of 88%) it is preferred so to proceed that the grains absorb 3.5 to 4 kg. glucose chips per 100 kg. of grain whose mean moisture content is 15%.

In general, basing all calculations on dry substance content, both with regard to the grain and with regard to the carbohydrate and taking into consideration, on the other hand, the pure carbohydrate, that is to say having a D.E. of 100%, thus being free of salts and other foreign substances, the preferred quantity of carbohydrate to be added to 100 kg. of grain lies between 1 and 5 kg. and is preferably about 3.5 kg. The optimal quantity within the range of 1% to 5% by weight however varies with the cereal treated and varies according to the desired yield and activation.

It is possible to cause less than 1% by weight of carbohydrate to be absorbed on the cereal grain but this does not lead to a substantial activation of the enzymatic system. Above 5%, the effect of the carbohydrate diminishes and the carbohydrate then tends to act only as an additive and finally to render the finished malt sticky.

In order to determine the quantity of a carbohydrate material, such as saccharose, invert sugar, molasses etc., to be used, one should take into account the exact carbohydrate content of the substance, that is to say its D.E., its moisture content and also the moisture content of the cereal one wishes to treat.

The carbohydrate is advantageously applied to the grain in the form of an aqueous solution whose concentration can vary within wide limits. The concentration has only little influence on the effectiveness of the treatment. Thus the results registered with concentrations of 25° Balling and 60° Balling of aqueous solutions of carbohydrates are practically comparable. Below 25° Balling however, that is to say with a very dilute solution the quantity of liquid in contact with the grain can become too high. This causes the double disadvantage of a noticeable loss by filtration through the grain layer and of the necessity of having to dry to evaporate off excess water during the subsequent kiln-drying treatment. It is advantageous to operate in as concentrated a solution as possible. A concentration of 50° Balling makes it possible to treat the green malt in its entirety with a proportion of 2 to 4 kg. of glucose of 80% extract based on the dry substance per 100 kg. of barley, without loss by filtration, without the malt getting sticky, and whilst leaving a minimum of water for evaporation in the subsequent operation of drying. Moreover, a concentrated solution of sugar reduces the risk of heating and of fermentation of the grain mass. In practice, therefore, it is preferred to use a carbohydrate solution containing 30 to 65% by weight of carbohydrate.

Among the cereals to which the process according to the invention can be applied, may be mentioned particularly barley. All the barleys may be treated according to the invention but they do not all give the same result. The current varieties, namely the Balder, Kenya, Gatinais, Aurore, Herta, Proctor, Western, Kindred, Oregon, Australia barleys all give clearly positive results of great importance in the commercial field. The extreme values of the increase of the extract in relation to the dry substance are 1.31 and 2.41 for the barleys treated with a quantity of about 3.5 kg. of glucose of 80% of dry substance to 100 kg. of processed barley. It is obvious that the improvement of the Kolbach index and likewise that of the proteolytic power varies with the variety of the barley.

As has been indicated above, the absorption of at least one carbohydrate, preferably in an aqueous solution, by the grains can take place in the course of the process of malting comprising the essential operations of soaking, of germination and of drying of the grains. The moment at which the absorption of the carbohydrate by the grains can take place can vary, but it is generally preferred that this absorption takes place after the soaking of the grains and before their drying, for instance during their germination. Favourable results have been obtained by treating the grains with an aqueous solution of at least one carbohydrate within the 24 hours preceding the drying of the germinated grains.

The moment at which one causes the carbohydrate to be absorbed by the grain is of considerable importance so that the treatment may act with certainty and with the maximum of efficacity. Whatever may be the type of the kiln used for drying the grain, it is preferred to treat the grain within at least 24 hours, and on the average 12 hours, before it is dried. The action of the enzymes and the chemical and biochemical reactions are completed in the course of the firt period of drying in the kiln in a warm atmosphere of about 40° C. in the grain. If one applies the solution on the first, second, third, fourth, fifth, and sixth days of the germination, intense biological phenomena are produced which manifest themselves during the last days of the germination by a violent heating of the layers of grain which are difficult to keep at the temperature of germination (12° to 20°) and by an odour of fermentation which shows that the sugar solution is being wastefully degraded and by plant mildew and microorganisms. A germination which is difficult to control and a wasteful loss of the sugar having served for the treatment therefrom results. If one treats from 20 hours to 4 hours before the grain is placed in the drying kiln these phenomena are substantially lessened and the chemical and biochemical reactions, not yet explained, are revealed by a peculiar and characteristic odour.

With regard to the method of application of the carbohydrate, it can likewise vary. One can, for instance, spray onto the grains an aqueous solution containing at least one carbohydrate or else impregnate the grains with such a solution in another manner, for example by steeping them in a drum within the 24 hours which precede the treatment in the drying kiln or else in submitting the mass to an agitation or kneading, in order to enhance an even distribution of the carbohydrate in the grains, or else by forcing the solution to penetrate into the grain by means of a differential pressure treatment.

The present invention also includes as a new industrial product the cereal grains treated by the above described process, particularly the malt grains containing at least one extrinsic carbohydrate.

The presence in the grain of an extrinsic carbohydrate, i.e. one of outside origin, can be detected in the malt-grains by a certain number of chemical reactions, notably by the characteristic reactions of sugars. Among these reactions are inter alia the reduction of Fehling's solution, the reduction of ammoniacal silver solution, the Bose reaction (reaction of an alkaline sugar-solution with orthodinitrobenzene, with production of a violet colour) and the Molish reaction. It should be made clear that in general all the malts give only a faint reaction to the methods for detecting sugars. What characterizes the malts treated by a carbohydrate is that these reactions are rapid and marked; thus, with regard to the reduction of Fehling's solution, the precipitate of cuprous oxide appears instantaneously and is abundant. It should also be noted that if the added carbohydrate is a non-reducing sugar such as for example saccharose, hydrolysis of the carbohydrate must be effected before applying methods for the detection of sugars. The chaff and radicels originating from the malts treated by a carbohydrate have the same characteristics. The reduction of Fehling's solution is carried out on a solution obtained after soaking 10 g. of treated malt, of chaff or of radicels for 5 minutes in 100 ml. of water at 200° C.

The invention thus further comprises as a new industrial product, malt containing an added carbohydrate, such as glucose. Such added carbohydrate may for example be detected by any one of the characteristic chemical reactions of sugars, notably by reduction of Fehling's solution.

Other features and details of the invention will appear in the course of the following description of one embodiment by way of example of carrying-out the process according to the invention, in which description reference will be made to the attached drawing which represents diagrammatically the various stages of the process according to the invention.

From a silo 2 one feeds the barley in grains which can contain 12–12% of moisture into a soaking reservoir 3 into which one likewise introduces water by a pipe 11 and air by a pipe 4. The soaking of the barley-grains is carried out by leaving them for about 66 hours in the soaking reservoir.

The soaked barley containing for instance 45% of moisture is fed to a germinator 5 of any type, containing for example a floor, an open or closed compartment, a rotary drum or some other appropriate device for germination. The soaked barley-grains remain in the germinator 5, into which one introduces air at 6, for about 7 days. The mass of grains contained in the germinator 5 is turned over from time to time for example by means of devices called "returners" in order to assure a uniform germination in the whole mass of grains.

In the germinator 5 one also subjects the germinated grains forming the green malt, preferably about 12 hours before drying the latter, to a spraying with the aid of an aqueous solution containing at least one carbohydrate, such as glucose. The aqueous spraying solution is led for instance under pressure from a reservoir 7 into a spraying ramp 8, arranged so as to permit uniform spraying and close contact of the whole grain mass by the said carbohydrate solution. If one uses a germinator of the compartment type the spraying ramp 8 can advantageously be mounted on the "returner" device being movable from one end of the bin or compartment to the other. This particular arrangement makes it possible to cause a predetermined quantity of carbohydrate solution to be evenly absorbed by the green malt-grains.

The grains of green malt having absorbed the solution of carbohydrate are then led into a drying tower or kiln 9, which can comprise several superimposed floors, in which a progressive grain-drying operates, due to a source of heat 10 provided at the base of the tower. If the drying tower 9 contains two floors, the green malt can stay at the upper floor for 24 hours, where it is subjected to a drying at 50°–60° C., which reduces its moisture content from 45% to about 8 to 14%, when it is then led to the lower floor where it likewise remains for 24 hours and is dried at a temperature rising progressively to 85–90° C. This temperature of 85°–90° C. is maintained for 4–5 hours. The final moisture content is then about 4%.

At the outlet of the drying tower 9 one obtains the malt with its radicels. The grains of malt and the radicels are then separated, in the well known manner, after which the de-germinated malt is placed in a storage silo, prior to its polishing and its bagging.

Instead of treating the grains in the germinator with an aqueous solution containing at least one carbohydrate, one can carry out this treatment at another stage of the process of malting, particularly in a chamber or an absorption or impregnation vat, which can, if necessary be of the mixer type, in which the green malt, coming from the germinator, is collected before being led to the drying tower or else in a machine where one can subject the malt to a differential pressure treatment. One can likewise treat the grains before or during the drying. The drying or treatment in the tower begins at the moment when a current of hot air is applied to the green malt. Thus it may be advantageous to treat the grains in a tower with 3 floors or during a period of treatment in the tower at a low temperature in a single-floor tower (Winkler), in a continuous vertical tower, in a closed bin or in a drum. In these last cases the drying treatment may be modified as desired by regulating the method of drying, the flow and the temperature of the air and the duration of the treatment in the tower.

If one cannot obtain the carbohydrate, such as glucose, in liquid form at the glucose-works, at the sugar mill, at the maize mill etc., one can prepare the carbohydrate solution, in particular of glucose, as follows:

The carbohydrate such as glucose can be melted, dissolved or diluted with a little water in a vat heated by any source of heat and provided with an agitator. The quantity of added water must be sufficient to replace the water of crystallization evaporating during the melting in order to facilitate the dissolution or to obtain a first dilution. One must also take care to heat the carbohydrate progressively and evenly in order to avoid overheatings which can cause undesirable caramelization of the carbohydrate. When the heated mass has become syrupy, this mass is homogenized with the aid of the agitator.

The molten dissolved or diluted carbohydrate is then placed in a dilution vat, likewise provided with an agitator, into which water is introduced at a temperature sufficient for the dilution to take place easily under the influence of the agitation.

The quantities of water used are preferably such that the carbohydrate solution contains about 50% by weight of carbohydrate.

The method of application of the aqueous solution of carbohydrate such as glucose when treating the grain in a pneumatic malting bin will be considered in detail below. The success and the effectiveness of the treatment depend in a large measure on the manner in which the glucose solution is applied. The solution which is preferably of 50° Balling (this value has proved to be the most satisfactory in practice) must be atomized in the mass of the grain. In other words, the solution must be reduced to an extremely fine mist. This mist must fall on the grain at the same time as the "returner" passes into the bed of the grain.

To do this one secures on the "returner" and at about 20 centimetres from the bed of green malt, a ramp equipped with atomizers. The number of atomizers is calculated so that the volume of liquid used should be poured in one passage of the "returner" or possibly in one outgoing passage and one return passage. A pump conveys the solution towards the atomizers under a pressure of 2 to 3 kg./cm.$^2$.

In order that the invention may be well understood the following example is given by way of illustration only:

EXAMPLE

Barley to be treated: 10,000 kg.
Quantity of glucose chips used: 350 kg. per 10,000 kg. of barley
Concentration of the sugar solution: 50° Balling equalling 616 g. of dry content per litre
Quantity of glucose used: the glucose chips contain about 80 kg. of dry extract per 100 kg.; 350 kg. thus contain 80×3.5=280 kg. of extract Quantity of glucose solution used: 280 kg.: 0.616 litre= 455 litres
Length of the bin: 14 metres
Width of the bin: 2.60 metres
Speed of the "returner": 0.50 metre per minute
One treats the grain on an outgoing path and on a return path of the "returner" thus over a distance of 28 metres
The treatment thus takes 28×0.50=56 minutes or approximately one hour
Output of the combined atomizers: 455 litres per hour
One atomizer, suitable for the treatment, yields an output of 70 to 80 litres per hour. The ramp is then equipped with 7–8 atomizers. In this case it is more advantageous to mount two ramps of 4 atomizers on the "returner" in order to assure a better distribution particularly if the returner is of the cork-screw type
Pressure of the pump: 2 to 3 kg./cm.$^2$.

Certain precautions should be taken during the treatment in the tower or drying of the malt.

One has thus seen in the example given above that one has discharged a volume of 455 litres onto the grain. It is well understood that an additional quantity of water will have to be evaporated during the drying or treatment in the tower, i.e. the water contained in the sugar solution and that on the other hand the sugar to a noticeable extent counteracts the drying of the grain and slows it down.

If the charging of the kiln has reached its upper limit, it will be necessary to strengthen the ventilation so as not to have too high degree of humidity at the end of the treatment in the tower. Thus, with towers with natural draught, one might encounter certain difficulties if one charges the platforms of the tower too heavily.

Moreover, it is desirable to pay attention to the presence of sugar which might form with the amino acids of the grain, the melanoidines, if one carelessly carries out the treatment in the tower by elevating the temperature too strongly at the start and above all during the heating. One could thus obtain a stronger colouration than is desired.

It must likewise be pointed out that the use of insufficiently refined sugar can likewise lead to a too high colouring of the malt. On the other hand the presence of sugar helps in the obtaining of the colouring by the brewer for the manufacture of his special beers.

Barleys of very different origins have been treated by the process according to the invention and the malt obtained has been analyzed in order to determine its dry extract, its total content of nitrogen, its content of soluble nitrogen and its Kolbach Index.

The tests which have been conducted both on a laboratory as also on an industrial scale, have been extended to barleys of the following origins:

American barley—Oregon
Danish barley—Carlsberg
Dutch and Belgian barley—Balder
Czech barley
Australian barley
French barley—Aurore
Danish barley—Herta The following Table I gives an account of the results of the analyses conducted on the above-mentioned barleys. In this table:

A=test-samples of green malt removed before absorption of glucose.
B=samples of malt taken from the outlet on the drying-tower after absorption of glucose in the proportion of 3.5 kg. of glucose of 80% of extract on the dry substance per 100 kg. of grain.
D=difference between the values found with the samples A and B.

Table I

|  | Oregon | | | Carlsberg | | | Balder | | | Czech | | |
| --- | --- | --- | --- | --- | --- | --- | --- | --- | --- | --- | --- | --- |
|  | A | B | D | A | B | D | A | B | D | A | B | D |
| Dry Extract (percent) | 79.73 | 81.04 | +1.31 | 78.67 | 80.17 | +1.50 | 79.77 | 81.36 | +1.59 | 79.88 | 81.06 | +1.18 |
| Total Nitrogen (percent) | 10.40 | 10.33 | −0.07 | 10.58 | 10.38 | −0.20 | 9.94 | 9.74 | −0.20 | 11.26 | 11.23 | −0.03 |
| Soluble Nitrogen (percent) | 3.87 | 4 | +0.13 | 3.37 | 3.64 | +0.27 | 3.72 | 3.97 | +0.25 | 4.20 | 4.35 | +0.15 |
| Kolbach Index | 37.21 | 38.72 | +1.51 | 31.85 | 35.07 | +3.22 | 37.42 | 40.76 | +3.34 | 37.39 | 38.74 | +1.35 |

|  | Australia | | | French Barley Aurore | | | Herta | | |
| --- | --- | --- | --- | --- | --- | --- | --- | --- | --- |
|  | A | B | D | A | B | D | A | B | D |
| Dry extract (percent) | 77.89 | 80.30 | +2.41 | 78.24 | 79.50 | +1.26 | 77.17 | 78.72 | +1.55 |
| Total Nitrogen (percent) | 10.45 | 10.35 | −0.10 | 10.86 | 10.63 | −0.23 | 12.13 | 12.15 | +0.02 |
| Soluble Nitrogen (percent) | 3.34 | 3.91 | +0.57 | 3.54 | 3.79 | +0.25 | 3.45 | 3.77 | +0.32 |
| Kolbach Index | 31.96 | 37.87 | +5.91 | 32.60 | 35.65 | +3.05 | 28.44 | 31.03 | +2.59 |

The examination of Table I reveals the following effects resulting from the application of the process according to the invention.

(1) *Dry extract.*—One obtains an unexpected increase of the percentage of dry extract. The application of the process according to the invention to an Australian barley, which has naturally a poor dry extract, gives an increase of the percentage of dry extract by 2.41%, which is particularly remarkable. Even in the case where one treats by the process according to the invention, a barley with a naturally high dry extract, such as Czech barley, one still obtains an increase of 1.18% of the dry extract, which again constitutes a remarkable result.

(2) *Total nitrogen.*—In nearly all cases one obtains a very slight decrease of the total percentage of nitrogen.

(3) *Soluble nitrogen.*—In all cases a very strong increase of soluble nitrogen content is noted. The maximum increase of this content is 0.57% (for Australian barley) and the minimum increase is of 0.13% (for Oregon barley).

It is furthermore noted that the increase of soluble nitrogen content is particularly impressive with barleys which are well known for the fact that degradation of their nitrogenous material takes place with difficult.

(4) *Kolbach index.*—The maximum increase in the value of the Kolbach Index is 5.91 (for Australian barley). This surprising increase of the Kolbach Index has been obtained with a barley whose nitrogenous materials were difficult to degrade.

The minimum increase found was 1.35 for a Czech barley, the nitrogenous materials of which are much easier to degrade.

There will now be compared in greater detail the results obtained, on the one hand by the classic malting, and on the other hand by the malting with absorption of glucose, of Australian barleys of the type Standard III.

These results are recorded in the Table II below:

It is to be noted that the moisture content of the malts obtained by the classic process and of the malts to which glucose has been added have been reduced by calculation to the same value of 3.96% so that the yields in malting may be compared.

Also, in order to introduce glucose into the calculation of yield, it is obviously necessary by the calculation, to bring its moisture content into agreement to that of the processed barley.

Table II

|  | Malt obtained by the classic process | Malt to which glucose was added |
| --- | --- | --- |
| Yield in malting per 100 kg. of barley (moisture content 15%) | 84.5 | 87.4 |
| Yield in malting per 100 kg. of barley (moisture content 15%) + glucose (moisture content 15%) |  | 84.5 |
| Glucose used per 100 kg. of barley (moisture content reduced to 15% by calculation) |  | 3.37 |
| Extract on dry material | 78 | 80.3 |
| Soluble nitrogen | 3.34 | 3.91 |

In the case of glucose having been added to the malt, the difference of yield in the malting, calculated on the barley, 87.4−84.5=2.9 kg., must originate from the added glucose. The greater part of the waste or loss of 3.37−2.90=0.47% originates from the moisture content of 15% at the start, reduced to 3.96% at the end of the malting operations.

The first interesting conclusions to be drawn from these results are the following:

(1) The yield in malting, calculated on the barley, increases by 2.9%. If one considers the quantity of malt produced, 87.4 kg. instead of 84.5 kg., the production starting with same quantity of treated barley increases by $$\frac{2.9}{84.5} = 3.43\%$$

without any important changes being necessary in the existing installation.

(2) The yield in malting calculated on the barley and glucose used is not affected at all.

The following calculation shows the influence of the addition of sugar (3.37%) on the increase of the extract based on the dry substance which rises from 78 to 80.3%.

One can admit that the increase in yield, calculated on the barley, must be attributed to the sugar. This increase was:

$$87.4 - 84.5 = 2.9$$

It is permissible to say that of 87.4 kg. of malt produced, 84.5 kg. originate from the barley and 2.9 kg. originate from the sugar. Admitting that the moisture contents of the malt and of the sugar are identical in the end product (3.96%) and considering the dry material one can say that for 83.93 kg. of dry substance (87.4×0.9604)
81.15 kg. originate from the barley (84.5×0.9604), and
2.78 kg. originate from the sugar (2.9×0.9604)

If one considers 100 kg. of dry substance $$\frac{81.15}{83.93}=96.68 \text{ kg. originate from the barley, and}$$

$$\frac{2.78}{83.93}=3.32 \text{ kg. originate from the sugar}$$

What is the extract which one can expect from such a mixture?

The control malt has an extract based on the dry substance of 78%
Glucose has an extract based on the dry substance of 100%

| | |
|---|---|
| 96.68 kg. of malt at 78% of extract in relation to the dry substance give | $96.68 \times \frac{78}{100} = 75.41$ kg. of extract |
| 3.32 kg. of sugar at 100% of extract in relation to the dry substance give | $3.32 \times \frac{100}{100} = 3.32$ kg. of extract |
| 100 kg. of treated malt should in theory give | 78.73 kg. of extract |

The theoretical increase of the extract in relation to dry substance thus amounts to: 78.73−78=0.73.

The tests, however, reveal that the increase of the percentage of the extract in relation to the dry substance is well above 0.73% and is in fact 2.3%.

It is therefore to be seen that the absorption of glucose has the unexpected effect of increasing the percentage of extract based on the dry material to an extent of three times greater (2.3%) than the theoretical increase (0.73%)

The whole value of the process according to the invention resides in this surprising increase of the percentage of extract on the dry material obtained by the absorption of glucose by the malt treated by the process according to the present invention.

It is also to be noted that the malt to which the glucose has been added presents a soluble nitrogen content higher by 0.57% than that of the malt obtained by the usual process. This increase of the percentage of soluble nitrogen is, itself also surprising because the added carbohydrate is free from nitrogen.

Although the applicant does not desire to be limited by a theoretical explanation, it appears that the remarkable properties conferred on the malt by the absorption of an extrinsic carbohydrates may be attributed to the phenomena of enzyme activation. It is permissible to suppose that under the influence of the absorbed carbohydrate the whole enzymatic system of the malt is activated, which system includes besides proteinases and amylases, other enzymes such as phosphatases, catalases and in particular cytase.

The reserve materials of the cereals, that is the starch, the complex proteins, the fats etc., are contained in cells, the walls of which are mainly formed of cellulose and hemicellulose. Cytase is an enzyme which specifically attacks the hemicellulose of the cell walls. Once these walls are attacked and broken down they become permeable in such a way to permit the passage of other enzymes which in their turn specifically attack the substrate contained in the cells. Among these other enzymes, the amylases break down and attack the starch, the proteinases break down the complex nitrogenous materials and the lipases attack the fats.

There is every reason to believe that cytase activated by the addition of the carbohydrate attacks the walls of the cells more strongly and thus opens a broader way to the other enzymes, which permits the solubilization of materials, mainly carbohydrate and proteinaceous material which had not been used up to now. It may also be supposed that lichenase which constitutes an enzyme of the same group as cytase and which appears equally activated, has the effect of hydrolyzing the lichenin (one of the hemicelluloses of the cellular walls), in such a way that one obtains cellobiose, a disaccharide transformed into glucose by the cellobiase, which is shown by a fresh increase of extract.

All these phenomena of activation of the enzymes, obtained by the absorption of an extrinsic carbohydrate, lead towards the obtaining of solutions much richer in extract than the solutions starting from barleys which had undergone the usual process of malting.

The following findings support the existence of chemical and biochemical reactions in the grain treated by glucose.

(1) Not only does the soluble nitrogen of the malt increase in the proportions already quoted, but the composition and fractionation of these nitrogenous substances are profoundly modified.

The fractionation of the soluble nitrogenous substance of the malt according to the classic method of Lundin and the determination of formol nitrogen produced the following results:

| | Usual malt | Malt to which glucose was added |
|---|---|---|
| Total nitrogen (percent) on dry substance | 10.2 | 10 |
| Soluble nitrogen (percent) based on dry substance | 3.16 | 3.40 |
| Lundin fractionation in percent of soluble nitrogen: | | |
| A | 33.4 | 31.5 |
| B | 16.8 | 21.2 |
| C | 49.7 | 47.3 |
| Formol nitrogen, mg./100 g. dry substance | 79.5 | 91.8 |

This shows:

A. Decrease of the fraction A, the most complex one. Thus a much more vigorous break down.
B. Increase of the fraction B, eminently favourable for obtaining an abundant and stable froth in beer.
C. Increase of formol nitrogen, one of the basic foods of the yeasts.

(2) The results of dosing standard malts with totally preformed reducing sugars and malts to which glucose has been added, are combined in the following table A. Standard malt
B. Malt to which glucose has been added (the results are expressed in percent on dry material.)

| Malts | Glucose | Glucose + saccharose | Saccharose |
|---|---|---|---|
| Danish: | | | |
| A | 2.41 | 8.13 | 5.72 |
| B | 3.72 +1.31 | 9.18 | 5.46 |
| Danish: | | | |
| A | 2.5 | 8.42 | 5.89 |
| B | 3.6 +1.1 | 9.38 | 5.71 |
| Cinjavie: | | | |
| A | 2.32 | 7.27 | 4.95 |
| B | 3.26 +0.84 | 8.06 | 4.82 |
| Balder: | | | |
| A | 2.61 | 8.12 | 5.51 |
| B | 3.95 +1.24 | 9.57 | 5.62 |

One has previously seen that, on 100 kg. of treated dry malt, 3.92 kg. of dry substance should logically have originated from the added sugar. However, the analysis of the reducing sugars pre-formed in the dry malt, shows only an increase varying between 0.84 to 1.24. The substance has not disappeared since in weight one recovers almost the entire weight of the sugar added in the course of the treatment and, on the other hand, the yields of malting in relation to the dry substance processed (barley+sugar) are not modified. This appears to prove that the greater part of the added sugar has reacted, that is to say has entered into combination with the malt.

The following experiment has been carried out on a Balder barley in the laboratory. It shows the variation of weights of the dry substance of an ordinary malt and of the same malt to which glucose had been added. It completely confirms what has just been said. In the analysis one does not recover the added sugar, but one entirely recovers the weight of the materials put into the process.

VARIATIONS OF THE WEIGHT OF THE DRY SUBSTANCE BY TREATMENT ACCORDING TO THE PROCESS ACCORDING TO THE INVENTION

[The results are expressed in g.]

| | Control Experiment | Treated | Difference |
|---|---|---|---|
| Quantity of green malt worked up | 500 | 500 | |
| Moisture content | 42.9 | 42.9 | |
| Dry substance | 285.50 | 285.50 | |
| Carbohydrate expressed in dry substance | | 8.75 | |
| Dry substance (malt and radicels) before treatment in the tower | 285.50 | 294.25 | 8.75 |
| Malt and radicels after treatment in the tower (expressed on the substance as such) | 294.90 | 303.50 | |
| Malt (on substance as such) | 288.20 | 295.50 | |
| Radicels (on substance as such) | 6.70 | 8.00 | |
| Moisture content | 4.63 | 4.48 | |
| Malt + radicels expressed in dry substance | 281.24 | 289.90 | 8.66 |
| Malt expressed in dry substance | 274.85 | 282.26 | 7.41 |
| Radicels expressed in dry substance | 6.39 | 7.64 | 1.25 |
| Reducing sugars on dry substance | 7.20 | 11.17 | 3.97 |
| Reducing sugars on percent on dry substance | 2.61 | 3.95 | 1.34 |

Furthermore one can conclude that:

(1) The content of saccharose has practically not changed.

(2) The content of reducing sugars increases only slightly and the content in sugar of a malt so obtained remains entirely within the generally encountered forms.

The increase of the Kolbach Index, the increase of the percentage of soluble nitrogen and the increase of the extract, on the dry material obtained, in a surprising manner, by the process according to the present invention, show remarkable advantages in a brewery, using malts treated by the new process for the manufacture of beer.

As well as barley, rye and wheat have also been treated by the process according to the invention. These have been treated in the proportion of 3.5 kg. of glucose chips (at 80% of dry extract) per 100 kg. of grain.

The properties of the treated malts obtained are compared with those of the same malts non-treated in the two following tables.

Table III
RYE

| | Dry extract | Total nitrogen | Soluble nitrogen | Kolbach Index |
|---|---|---|---|---|
| treated | 88.53 | 9.55 | 6.49 | 67.95 |
| untreated | 86.85 | 10.05 | 6.46 | 64.27 |
| difference | +1.68 | −0.50 | +0.03 | +3.68 |

Table IV
WHEAT

| | Dry extract | Total nitrogen | Soluble nitrogen | Kolbach Index |
|---|---|---|---|---|
| treated | 87.13 | 12.14 | 6.01 | 49.51 |
| untreated | 85.84 | 12.51 | 5.96 | 47.64 |
| difference | +1.29 | −0.37 | +0.05 | +1.87 |

It is obvious that the invention is not exclusively limited to the form of realization described above and that various modifications can be applied to this form of carrying it out without departing from the scope of the invention such as it is defined in the following claims.

We claim:

1. A process for the treatment of dry cereal grains comprising submitting said grains to water soaking and germination treatment and subsequent drying treatment, the soaking being effected in a carbohydrate solution containing 30 to 60% by weight of carbohydrate thereby to cause the germinated grains, before the beginning of the drying treatment, to absorb at least 1% by weight of a carbohydrate, considered as pure dry substance in relation to the weight of the said dry grains, said carbohydrate being selected from the group consisting of the mono-, di-, and tri-saccharides.

2. A process according to claim 1, in which the carbohydrate is glucose.

3. A process according to claim 1, wherein the carbohydrate is added at the earliest about 24 hours before the end of the germinating treatment and the beginning of the drying treatment.

4. A process according to claim 1 wherein the carbohydrate is added about 12 hours before the end of the germinating treatment and the beginning of the drying treatment.

5. A process according to claim 1 wherein the supplied quantity of carbohydrate is lower than that which renders the finished malt sticky.

6. A process according to claim 1 wherein the supplied quantity of carbohydrate is comprised between 1% and 5% by weight, in relation to the weight of the said dry grains.

References Cited in the file of this patent

UNITED STATES PATENTS

| 1,084,943 | Kammer | Jan. 20, 1914 |
| 1,950,701 | Spangenberg | Mar. 13, 1934 |